United States Patent [19]

Moote et al.

[11] Patent Number: 4,495,160

[45] Date of Patent: Jan. 22, 1985

[54] REMOVAL AND RECOVERY OF MAGNESIUM, STRONTIUM AND BARIUM FROM BRINES

[75] Inventors: Truman P. Moote; Robert L. Reed, both of Tulsa, Okla.

[73] Assignee: Standard Oil Company, Chicago, Ill.

[21] Appl. No.: 479,409

[22] Filed: Mar. 28, 1983

[51] Int. Cl.$^3$ ............... C01F 1/00; C01F 5/00; C01F 11/00

[52] U.S. Cl. .................. 423/158; 423/164; 423/165; 423/166; 423/554; 423/637; 423/639

[58] Field of Search .............. 423/164, 166, 639, 158, 423/554, 165, 637; 23/304

[56] References Cited

U.S. PATENT DOCUMENTS

| | | | |
|---|---|---|---|
| 2,191,560 | 2/1940 | Farnsworth et al. | 23/201 |
| 2,405,055 | 7/1946 | Robinson | 23/201 |
| 3,080,215 | 3/1963 | Waldron et al. | 23/201 |
| 3,239,318 | 3/1966 | Goodenough | 423/304 |
| 4,210,626 | 7/1980 | Berrie et al. | 423/166 |
| 4,261,960 | 4/1981 | Boryta | 423/179.5 |
| 4,271,131 | 6/1981 | Brown et al. | 423/179.5 |
| 4,287,163 | 9/1981 | Garrett et al. | 423/283 |
| 4,291,001 | 9/1981 | Repsher et al. | 423/179.5 |

OTHER PUBLICATIONS

Kirk-Othmer, Encyclopedia of Chemical Technology, p. 729, 2nd ed., vol. 12.

*Primary Examiner*—Gregory A. Heller

[57] ABSTRACT

Magnesium is removed from brine by contacting the brine with calcium hydroxide at temperatures above about 80° C. but below the boiling point of the brine. The contacting results in the formation of magnesium hydroxide precipitate which is substantially insoluble in the mother liquor at those temperatures and strontium hydroxide which is dissolved in the mother liquor. When the contacting is carried out at a temperature above about 90° C., magnesium hydroxide precipitate is fast settling and filterable; accordingly, it is removed from the mother liquor by a conventional process, such as filtering. The mother liquor is then cooled to cause the precipitation of at least a substantial part of strontium hydroxide present in the mother liquor. The precipitate of strontium hydroxide is recovered by a conventional process such as filtering. If precipitation upon cooling is insufficient, carbon dioxide gas is introduced into the mother liquor to effect the precipitation of strontium hydroxide. Barium can be removed and recovered in the form of barium sulfate by reacting the remaining mother liquor with sodium sulfate.

In order to produce a faster-settling precipitate of magnesium hydroxide, the brine is contacted with a sufficient amount of a solution or slurry of calcium hydroxide in water to bring the concentration of magnesium in the resulting liquid to the range from about 0.023 mols of magnesium per liter to about 0.04 mols of magnesium per liter.

32 Claims, 4 Drawing Figures

REMOVAL AND RECOVERY OF MAGNESIUM, STRONTIUM AND BARIUM FROM BRINES

BACKGROUND OF THE INVENTION

This invention relates to the removal and the recovery of metal compounds from brines. In particular, it relates to the removal and the recovery of compounds containing magnesium, strontium and barium from brines.

Brines, such as Smackover formation well brines, contain a variety of metals including magnesium, strontium and barium. A number of processes have been proposed for the removal and the recovery of these metals.

The removal and the recovery of magnesium, strontium and barium from brines provides two important commercial advantages. First, the recovered compounds of these metals can be sold on an open market. Second, the removal of these metals from brines permits the recovery of valuable lithium from brines in an uncontaminated, more valuable form. See, e.g., U.S. Pat. No. 4,271,131 (Brown, et al.) and U.S. Pat. No. 4,261,960 (Boryta) column 1, lines 40–49.

Magnesium can be removed and recovered from brines by contacting it with lime to form a precipitate of magnesium hydroxide. Generally, such precipitates are slow settling and difficult to separate from the mother liquor by filtering. See, e.g., U.S. Pat. No. 2,405,055 (Robinson, et al.), column 1, lines 7–16; Kirk-Othmer, 12 Encyclopedia of Chemical Technology (2 ed.) p. 729. Since quicker settling and filterable precipitate would reduce capital and operating costs, efforts have been made to improve the basic process for recovering magnesium. For example, the Robinson patent discloses that a magnesium hydroxide precipitate which settles more rapidly can be produced "by diluting the sea water with water or brine free from dissolved magnesium salts, before or at the time of precipitation, accompanied by a suitable control of the amount of alkali", column 3, lines 39–42. Similarly, U.S. Pat. No. 2,191,560 (Farnsworth, et al.) discloses that settling characterstics of a magnesium hydroxide precipitate can be enhanced by reacting lime with brine at temperatures above 105° F. and preferably at about 140° F. See column 2, lines 6–9.

U.S. Pat. No. 3,080,215 (Waldron, et al.) discloses a method for improving the poor filterability of a precipitate of magnesium hydroxide when separating it from the mother liquor. The method includes the use of slaked calcined dolomite slurry and reaction conditions that include temperatures of 40° to 80° C. See column 2, lines 27–41. The Waldron patent discloses that the precipitate form using its process is readily filterable. See column 2, lines 42–43.

It is also known that strontium can be removed from brines by contacting them with sodium sulfate. The contacting produces a precipitate which contains primarily strontium sulfate but includes about 2 weight percent of barium sulfate. Strontium-barium sulfate is useful but its price is relatively low because it is in competition with celestite, a mineral found in many countries including Mexico. Since barium is difficult and expensive to separate from strontium, the usefulness of the removed precipitate as the source of pure strontium is diminished by the presence of the barium contaminant. Additionally, the conversion of strontium-barium sulfate to a desired strontrium compound—strontium carbonate—is costly and laborious.

There is therefore a need for a process which would inexpensively and efficiently remove magnesium, strontium, and barium from brines and recover these metals in the form of uncontaminated desired compounds.

Thus, one object of the present invention is to provide an efficient process for sequentially removing and recovering from brines magnesium, strontium which is uncontaminated by barium, and barium.

Another object of the present invention is to provide an energy-efficient process for sequentially removing and recovering uncontaminated strontium and barium from brines.

Still another object of the present invention is to provide a process for recovery of strontium from brines in the form of a compound which can be easily converted into a commercially desirable strontium carbonate.

A further object of the present invention is to provide a process for the removal and the recovery of magnesium, strontium and barium, which process utilizes the natural heat of brines.

Still another object of the present invention is to provide a process for removing and recovering magnesium, strontium and barium, which process produces a fast-settling, easily filterable precipitate containing magnesium.

A still further object of the present invention is to provide a process which quickly and efficiently removes magnesium, strontium and barium from brines so that high purity lithium can be recovered from the remaining mother liquor.

Other objects of the present invention will become apparent to those skilled in the art upon studying this disclosure.

SUMMARY OF THE INVENTION

This invention provides an efficient and economical process for removing magnesium, strontium and barium from brines so that high purity lithium can be recovered from resulting mother liquor. Magnesium and strontium are removed sequentially in the form of uncontaminated compounds which are commercially desirable. In accordance with the process magnesium is first removed from a brine by contacting the brine with calcium hydroxide at temperatures above about 80° C. but below the boiling point of the brine. The contacting results in the formation of a magnesium hydroxide precipitate which is substantially insoluble in the mother liquor at those temperatures and strontium hydroxide which is dissolved in the mother liquor. If the temperature in the contacting zone is in the range from above 90° C. to the boiling point of the brine, the precipitate of magnesium hydroxide is fast settling and filterable; accordingly, it can be readily removed from the mother liquor by a conventional process, such as filtering. The mother liquor is then cooled to cause the precipitation of at least a substantial part of strontium hydroxide present in the mother liquor. The precipitate of strontium hydroxide is recovered by a conventional process such as filtering. If precipitation upon cooling is insufficient, carbon dioxide gas is introduced into the mother liquor to affect the precipitation of strontium hydroxide. Uncontaminated barium can be removed and recovered in the form of barium sulfate by reacting the remaining mother liquor with sodium sulfate.

In order to produce a faster-settling precipitate of magnesium hydroxide, the brine is contacted with a sufficient amount of a solution or slurry of calcium hydroxide in water to bring the concentration of magnesium in the resulting liquid to the range from about 0.023 mol Mg/liter to about 0.04 mol Mg/liter.

DETAILED DESCRIPTION OF THE INVENTION

It has been discovered that magnesium, strontium and barium can be sequentially removed and recovered from brines by an efficient and economical process. First, a brine is contacted with calcium hydroxide at a temperature in the range from about 80° C. to the boiling point of such brine. When the contacting is carried out at a temperature in the range from above 90° C. to the boiling point of the brine, it produces a precipitate of magnesium hydroxide which is fast settling and easily filterable.

The precipitate is allowed to settle and is recovered by filtering or any other suitable method. The mother liquor is then cooled to effect the precipitation of strontium hydroxide. Carbon dioxide can be added to facilitate the precipitation of strontium hydroxide. Strontium hydroxide is recovered. Barium is then precipitated from the remaining mother liquor by a suitable method such as by contacting the mother liquor with sodium sulfate. The contacting with sodium sulfate produces a barium sulfate precipitate which can be recovered by any suitable method such as filtration. Since generally the mother liquor contacted with sodium sulfate contains some strontium, the precipitate includes some barium sulfate in addition to strontium sulfate.

The remaining mother liquor can then be passed to a lithium recovery system. Since magnesium, strontium and barium have been removed from the mother liquor, the process of recovering lithium is simplified and it produces a higher purity lithium product.

The recovered strontium hydroxide can be converted to commercially desirable strontium carbonate by dissolving the hydroxide in hot water and contacting the resulting solution with a carbonate salt such as sodium carbonate.

Figure 1:
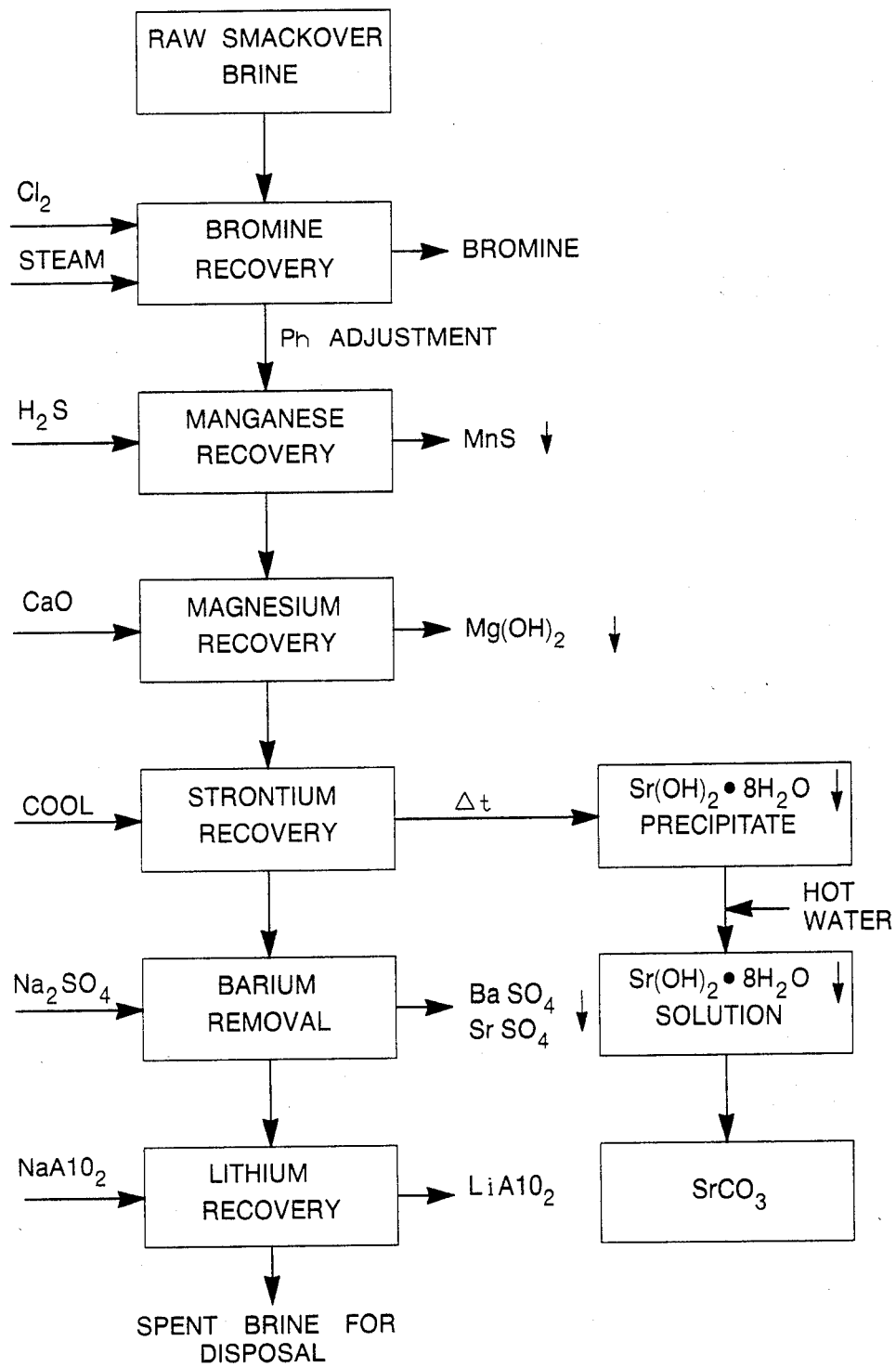
FIG. 1 is a schematic of a preferred embodiment of the continuous process for the removal and recovery of magnesium and strontium from brines of the present invention.

The invention will now be described in connection with the preferred embodiment of the process of the present invention depicted in the drawings. Referring now to FIG. 1, raw Smackover brine which is generally at about 80° C. or higher, is first passed through a bromine recovery zone. The pH of the bromine-free brine is then adjusted to the range from about 7 to about 8 and the brine is contacted by hydrogen sulfide to produce manganese sulfide precipitate. This precipitate is removed and the brine is then passed to the magnesium recovery zone.

It should be noted that the bromine and manganese recovery zones are not a part of this invention and are conventional. They are included in the description of the preferred embodiment for completeness of the description of the preferred embodiment. It should be understood that brines which have not been subjected to bromine and manganese recovery can be used in the process of the present invention.

The brine entering the magnesium recovery zone is heated to a temperature in the range from about 80° C. to the boiling point of the brine and contacted with calcium hydroxide. Calcium hydroxide is preferably in the form of a water based slurry (lime).

Figure 2:
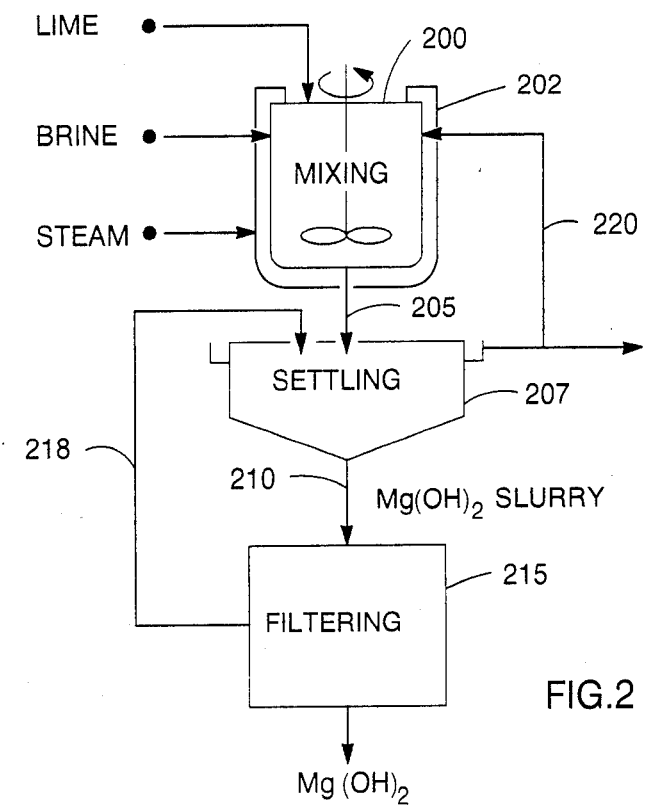
FIG. 2 depicts a flow diagram of a continuous process for the removal and recovery of magnesium from brines in accordance with the present invention.

The details of the preferred method of recovering magnesium are depicted in FIG. 2. As shown in FIG. 2, lime and brine are added to a jacketed tank 200. Steam is introduced into the jacket 202 to bring the temperature of the lime-brine mixture to a temperature in the range from about 80° C. to the boiling point of the brine. The contacting of brine with lime at these conditions produces a magnesium hydroxide precipitate which settles rapidly. To effect settling of the precipitate the liquid which contains the precipitate is passed from the jacketed tank 200 via line 205 to a settling tank 207. The precipitate settles near the bottom of the settling tank 207 to form a slurry. The slurry is passed via a line 210 through a suitable filter 215 to recover magnesium hydroxide. The choice of a suitable filter is within ordinary skills of one skilled in this art. The mother liquor is returned from the filter 215 to the settling tank via a line 218. The mother liquor is also recycled from the settling tank 207 to the jacketed tank 202 via a line 220. A portion of the mother liquor is directed via a line 225 to the strontium recovery zone. See FIG. 1.

The reason for recycling mother liquor to the jacketed tank 202 is to decrease the concentration of magnesium ions in the contacting zone. It has been found that a fast settling filterable precipitate is formed when the magnesium ions are diluted when brine is contacted with calcium hydroxide. In particular, it has been discovered that a precipitate having excellent settleability and filterability characteristics is formed when the concentration of magnesium ions in the mixture of brine-calcium hydroxide slurry is in the range from about 0.023 mol Mg/liter to about 0.04 per liter of the mixture.

Figure 4:
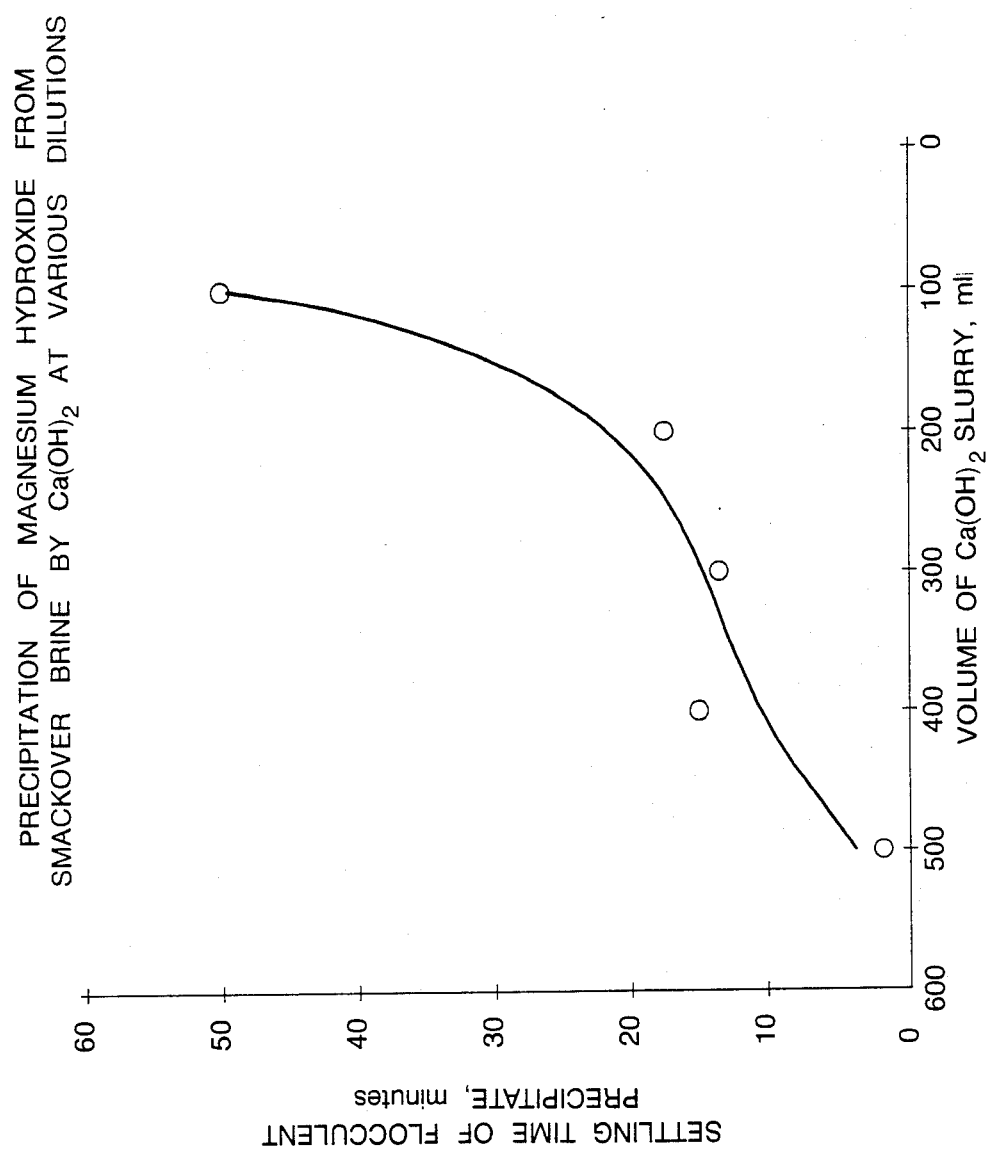
FIG. 4 depicts a graph of settling time of flocculant precipitate of magnesium hydroxide as a function of the volume of calcium hydroxide slurry.

FIG. 4 depicts a graph of the settling time of flocculant precipitate as a function of volume of the calcium hydroxide slurry. As shown by the graph the settling time decreases rapidly as the volume of the calcium hydroxide slurry is increased. The data points plotted in FIG. 4 were obtained by contacting 100 ml of brine containing 1800 ppm magnesium with calcium hydroxide slurry having 7.9 mmol of calcium. At 100 ml slurry volume 220 ppm of magnesium remained in mother liquor and at 500 ml slurry volume 12 ppm of magnesium remained in mother liquor.

The best results for Smackover brine were obtained with dilutions of 100 ml of brine containing 0.0076 mols of magnesium with 200 ml of calcium hydroxide slurry. For New Mexico brine the best results were obtained when 3 ml of brine containing 0.0079 mols of magnesium were contacted with 300 ml of calcium hydroxide slurry.

As shown in FIG. 1, the mother liquor is then passed to a holding tank (not shown) where it is cooled to effect the precipitation of strontium hydroxide. Generally, the precipitation of strontium hydroxide occurs when the temperature of the mother liquor reaches about 25° C. The precipitate can be further treated to convert it into a commercially desirable form—strontium carbonate. To achieve the conversion the precipitate is dissolved in hot water and contacted with a carbonate salt, such as sodium carbonate, to produce strontium carbonate. See FIG. 1.

As shown in FIG. 1, the mother liquor produced in the strontium recovery stage is then passed to the barium recovery stage where it is contacted with sodium sulfate to produce barium sulfate. It should be noted that the recovery of barium is an optional but not a necessary step of the process of the invention. The determination whether to include this step is governed by economic considerations and the desired quality of lithium (if the brine is further treated to recover lithium).

As shown in FIG. 1, lithium can be recovered from the mother liquor of the barium removal stage by contacting it with $NaAlO_2$ or by any other suitable method.

The following examples are included to further illustrate the present invention. They are not intended to restrict the scope of the invention in any manner.

EXAMPLE 1

The purpose of this example is to demonstrate that Smackover brine contains significant amounts of magnesium, strontium and barium. A sample of Smackover brine was analyzed by conventional methods. The following results were obtained.

| | Analysis of Smackover Brine | | | |
|---|---|---|---|---|
| | ppm | wt % | Mol/Liter | Mol % |
| Metal | | | | |
| Manganese | 125 | 0.10 | 0.00228 | 0.05 |
| Barium | 70 | 0.05 | 0.00051 | 0.01 |
| Strontium | 3,000 | 2.40 | 0.034 | 0.72 |
| Calcium | 28,000 | 22.40 | 0.699 | 14.73 |
| Magnesium | 1,840 | 1.47 | 0.076 | 1.60 |
| Potassium | 6,500 | 5.20 | 0.166 | 3.50 |
| Sodium | 85,000 | 67.98 | 3,697 | 77.87 |
| Lithium | 500 | 0.40 | 0.072 | 1.52 |
| Non-Metals | | | | |
| Chloride | 206,000 | | | |
| Bicarbonate | 250 | | | |
| Sulfate | 64 | | | |

The results show that significant amounts of magnesium, strontium and barium are contained in Smackover brine.

EXAMPLE 2

The purpose of this example is to demonstrate that as the mother liquor obtained from the recovery of magnesium hydroxide is cooled strontium hydroxide is precipitated but barium hydroxide is not precipitated.

Calculation of Strontium Recovery

Magnesium hydroxide has been separated at a temperature above about 80° C. and the mother liquor cooled to about 25° C.

(A) Total amount of $Sr(OH)_2.8H_2O$ in hot mother liquor from $Mg(OH)_2$ precipitation $$\frac{x \text{ wt \% } Sr(OH)_2.8H_2O}{2.4 \text{ wt \% Sr in Brine}} = \frac{265.6 \text{ gm/mol}}{87.6 \text{ gm/mol}}$$

$x = 7.3$ wt % $Sr(OH)_2.8H_2O$ in hot mother liquor (B) Strontium recovery after cooling to 25° C.

$$100 \times \frac{2 \text{ gms } Sr(OH)_2.8H_2O \text{ remaining in soln @ 25° C.}}{7.3 \text{ gms } Sr(OH)_2.8H_2O \text{ in solution at above about 80° C.}} =$$

25.6 wt % $Sr(OH)_2.8H_2O$ remaining in solution $100 - 25.6 = 74.6$ wt % $Sr(OH)_2.8H_2O$ precipitated @ 25° C.

(C) Total amount of $Ba(OH)_2.8H_2O$ in hot mother liquor $$\frac{x \text{ wt \% } Ba(OH)_2.8H_2O}{0.05 \text{ wt \% Ba in Brine}} = \frac{315.3}{137.3}$$

Figure 3:
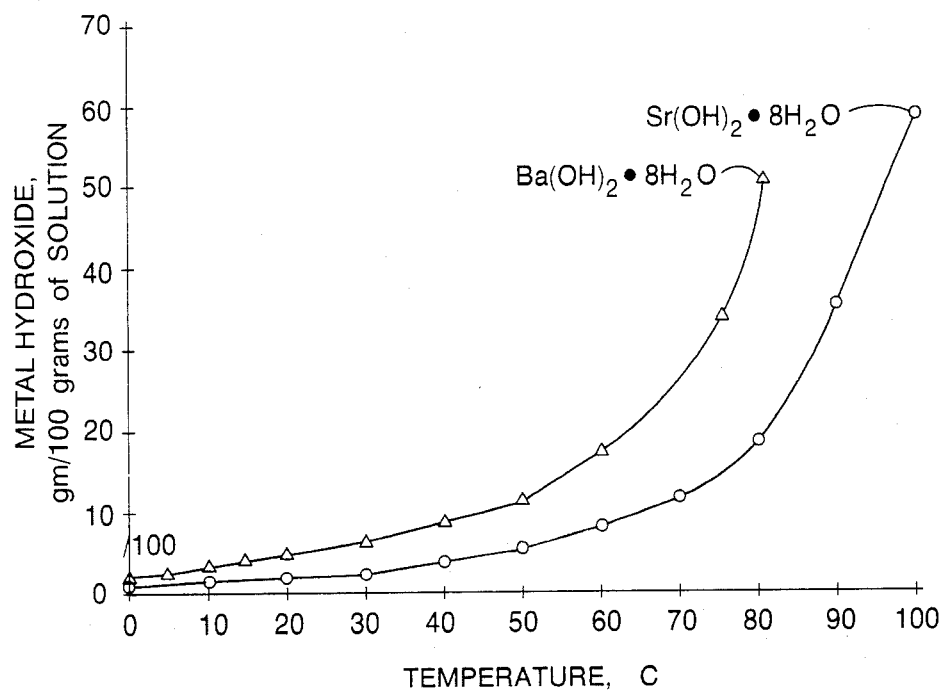
FIG. 3 depicts a graph of the concentration of barium and strontium hydroxide in solution as a function of temperature.

$x = 0.115$ wt % $Ba(OH)_2.8H_2O$ in hot mother liquor (D) No barium precipitated on cooling to 25° C. Solubility of $Ba(OH)_2.8H_2O$ at 25° C.=4.5wt%. See FIG. 3.

Total amount of $Ba(OH)_2.8H_2O$ present in mother liquor at 25° C. is 0.115 wt%. Therefore, no barium will precipitate.

Many changes and modifications will occur to those skilled in the art upon studying this disclosure. All such changes and modifications that fall within the spirit of this invention are intended to be included within its scope as defined by the appended claims.

We claim:

1. A process for sequentially removing magnesium and strontium from brines, said process comprising:
   (a) precipitating magnesium hydroxide from a brine at temperatures in the range from above 80° C. to about the boiling point of said brine to produce a mother liquor and magnesium hydroxide precipitate;
   (b) separating said mother liquor from said magnesium hydroxide precipitate; then
   (c) cooling said mother liquor to effect precipitation of strontium hydroxide; and
   (d) separating strontium hydroxide precipitate from the mother liquor.

2. The process of claim 1 wherein said brine is a Smackover formation well brine.

3. The process of claim 1 wherein said brine is a New Mexico brine.

4. The process of claim 1 wherein the step of precipitating magnesium hydroxide is effected by contacting said brine with a sufficient amount of water solution of calcium hydroxide, to bring the molar concentration of magnesium in said brine-solution mixture to the range from about 0.023 to about 0.04 per liter of brine-solution mixture, the step of separating is effected by filtering.

5. The process of claim 2 wherein the step of precipitating magnesium hydroxide is effected by contacting said brinewith a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

6. The process of claim 3 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

7. The process of claim 4 wherein said mother liquor is cooled to a temperature in the range from about 20° C. to about 30° C.

8. The process of claim 1 wherein the step of precipitating is carried out at a temperature above about 90° C.

9. A process for sequentially removing and recovering magnesium and strontium from brines, said process comprising:
  (a) precipitating magnesium hydroxide from a brine at temperatures in the range from above 80° C. to about the boiling point of said brine to produce a mother liquor and magnesium hydroxide precipitate;
  (b) separating said mother liquor from said magnesium hydroxide precipitate; then
  (c) recovering said magnesium hydroxide precipitate;
  (d) cooling said mother liquor to effect precipitation of strontium hydroxide; and
  (e) separating and recovering the precipitate of strontium hydroxide.

10. The process of claim 9 wherein said brine is a Smackover formation well brine.

11. The process of claim 9 wherein said brine is a New Mexico brine.

12. The process of claim 9 wherein the step of precipitating magnesium hydroxide is effected by contacting said brine with a sufficient amount of water solution of calcium hydroxide, to bring the molar concentration of magnesium in said brine-solution mixture to the range from about 0.023 to about 0.04 per liter of brine-solution mixture, the step of separating is effected by filtering.

13. The process of claim 10 wherein the step of precipitating magnesium hydroxide is effected by contacting said brine with a sufficient amount of water solution of calcium hydroxide, to bring the molar concentration of magnesium in said brine-solution mixture to the range from about 0.023 to about 0.04 per liter of brine-solution mixture and wherein the step of separating is effected by filtering.

14. The process of claim 11 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

15. The process of claim 9 wherein said mother liquor is cooled to a temperature in the range from about 20° C. to about 30° C.

16. The process of claim 9 wherein the step of precipitating is carried out at a temperature above about 90° C.

17. A process for sequentially removing magnesium, strontium and barium from brines, said process comprising:
  (a) precipitating magnesium hydroxide from a brine at temperatures in the range from about 90° C. to about the boiling point of said brine to produce a mother liquor and magnesium hydroxide precipitate;
  (b) separating said mother liquor from said magnesium hydroxide precipitate; then
  (c) cooling said mother liquor to effect precipitation of strontium hydroxide;
  (d) separating said precipitate of strontium hydroxide; and then
  (e) precipitating barium ions and separating the resulting precipitate.

18. A process of claim 17 wherein said brine is a Smackover formation well brine.

19. A process of claim 17 wherein said brine is a New Mexico brine.

20. A process of claim 18 wherein the step of precipitating magnesium hydroxide is effected by contacting said brine with a sufficient amount of water solution of calcium hydroxide, to bring the molar concentration of magnesium in said brine-solution mixture to the range from about 0.023 to about 0.04 per liter of brine-solution mixture, the step of separating is effected by filtering.

21. A process of claim 18 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

22. A process of claim 19 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

23. A process of claim 17 wherein said mother liquor is cooled to a temperature in the range from about 20° C. to about 30° C.

24. The process of claim 17 wherein precipitating of barium ions is effected by contacting the mother liquor produced in step (d) with sodium sulfate to produce a precipitate of barium sulfate.

25. A process for sequentially removing and recovering magnesium, strontium and barium from brines, said process comprising:
  (a) precipitating magnesium hydroxide from a brine at temperatures in the range from above 90° C. to about the boiling point of said brine to produce a mother liquor and magnesium hydroxide precipitate;
  (b) separating said mother liquor from said magnesium hydroxide precipitate;
  (c) recovering said magnesium hydroxide precipitate; then
  (d) cooling said mother liquor to effect precipitation of strontium hydroxide in the mother liquor;
  (e) separating from the mother liquor and recovering strontium hydroxide; and then
  (f) precipitating barium ions and recovering the resulting barium compound.

26. A process of claim 25 wherein said brine is a Smackover formation well brine.

27. A process of claim 25 wherein said brine is a New Mexico brine.

28. A process of claim 25 wherein the step of precipitating magnesium hydroxide is effected by contacting said brine with a sufficient amount of water solution of calcium hydroxide, to bring the molar concentration of magnesium in said brine-solution mixture to the range from about 0.023 to about 0.04 per liter of brine-solution mixture, the step of separating is effected by filtering.

29. A process of claim 26 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

30. A process of claim 27 wherein the step of precipitating magnesium hydroxide is effected by contacting said brine with a sufficient amount of water solution of calcium hydroxide to bring the molar concentration of magnesium in said brine-solution mixture to the range from about 0.023 to about 0.04 per liter of brine-solution mixture and wherein the step of separating is effected by filtering.

31. A process of claim 25 wherein said mother liquor is cooled to a temperature in the range from about 20° C. to about 30° C.

32. The process of claim 25 wherein precipitating of barium ions is effected by contacting the mother liquor produced in step (e) with sodium sulfate to produce a precipitate of barium sulfate.

* * * * *